United States Patent
Petit et al.

(10) Patent No.: US 9,156,510 B2
(45) Date of Patent: Oct. 13, 2015

(54) CLAMP MOUNTING SYSTEM

(71) Applicant: BTM Corporation, Marysville, MI (US)

(72) Inventors: Brian D. Petit, Algonac, MI (US); Andrew T. Sanders, Marysville, MI (US)

(73) Assignee: BTM Company LLC, Marysville, MI (US)

( * ) Notice: Subject to any disclaimer, the term of this patent is extended or adjusted under 35 U.S.C. 154(b) by 451 days.

(21) Appl. No.: 13/654,147

(22) Filed: Oct. 17, 2012

(65) Prior Publication Data

US 2014/0103591 A1    Apr. 17, 2014

(51) Int. Cl.
| B62D 65/18 | (2006.01) |
| B62D 65/02 | (2006.01) |
| B25B 5/00 | (2006.01) |
| B25B 5/08 | (2006.01) |

(52) U.S. Cl.
CPC ............ B62D 65/18 (2013.01); B25B 5/003 (2013.01); B25B 5/006 (2013.01); B25B 5/087 (2013.01); B62D 65/026 (2013.01); *Y10T 29/49826* (2015.01)

(58) Field of Classification Search
CPC ........ B62D 65/18; B62D 65/26; B25B 5/087; B25B 5/006; B25B 5/003; Y10T 29/026
USPC ....... 269/289 R, 37, 55, 60, 91–95, 309, 310, 269/20, 24, 25, 27, 28, 31, 32, 228, 201, 49, 269/216, 237, 229, 232, 233
See application file for complete search history.

(56) References Cited

U.S. PATENT DOCUMENTS

| 4,667,866 A | 5/1987 | Tobita et al. |
| 4,924,996 A | 5/1990 | Svensson et al. |
| 5,347,700 A | 9/1994 | Tominaga et al. |
| 5,907,489 A | 5/1999 | Elliott |
| 6,008,471 A | 12/1999 | Alborante |
| 6,378,855 B1 | 4/2002 | Sawdon et al. |
| 6,502,880 B1 | 1/2003 | Sawdon |
| 6,687,971 B2 | 2/2004 | Nakamura |
| 6,698,736 B2 | 3/2004 | Dugas et al. |
| 6,902,159 B2 | 6/2005 | Sawdon et al. |
| 7,029,000 B2 | 4/2006 | Petit et al. |

(Continued)

FOREIGN PATENT DOCUMENTS

| EP | 1837120 B1 | 7/2008 |
| JP | 05277848 A | 10/1993 |

(Continued)

OTHER PUBLICATIONS

Drawing of prior riser, bracket and clamp assembly (believed to have been publicly used in U.S. prior to Oct. 2011).

(Continued)

*Primary Examiner* — Lee D Wilson
*Assistant Examiner* — Nirvana Deonauth
(74) *Attorney, Agent, or Firm* — Harness, Dickey & Pierce, P.L.C.

(57) ABSTRACT

A single mounting device is provided for each trolley riser for use with a set of shims in order to accurately align and secure a clamp to a datum. In another aspect, a generally polyhedron-shaped clamp body is used with a mounting plate to secure a clamp in different orientations relative to a manufacturing plant locator.

29 Claims, 12 Drawing Sheets

(56) References Cited

U.S. PATENT DOCUMENTS

| | | |
|---|---|---|
| 7,156,385 B2 * | 1/2007 | Mulder .......................... 269/32 |
| 7,188,832 B2 | 3/2007 | Kita et al. |
| 7,370,856 B2 | 5/2008 | Sawdon et al. |
| 7,469,473 B2 | 12/2008 | Savoy |
| 7,516,948 B2 | 4/2009 | McIntosh et al. |
| 7,686,286 B2 | 3/2010 | Colby |
| 8,001,673 B2 | 8/2011 | Hur |
| 8,366,090 B2 * | 2/2013 | Yonezawa et al. ............ 269/309 |
| 2004/0239023 A1 * | 12/2004 | Sawdon et al. ................. 269/32 |
| 2009/0121403 A1 * | 5/2009 | McIntosh et al. ............... 269/32 |
| 2009/0289043 A1 | 11/2009 | Kilibarda |
| 2011/0291341 A1 | 12/2011 | Sawdon et al. |
| 2012/0030924 A1 | 2/2012 | Kilibarda et al. |
| 2012/0145514 A1 | 6/2012 | Magni et al. |
| 2013/0320607 A1 * | 12/2013 | Kaji et al. ..................... 269/309 |

FOREIGN PATENT DOCUMENTS

| | | |
|---|---|---|
| JP | 2003145363 A | 5/2003 |
| KR | 20040082843 A | 9/2004 |
| RU | 2219034 C1 | 12/2003 |

OTHER PUBLICATIONS

BTM Catalogue—Pneumatic Pin & Finger Clamps 732796DB (published prior to Oct. 2012).

BTM Catalogue—User Guide: Pin Locator Clamps 732868AB (published prior to Oct. 2012).

* cited by examiner

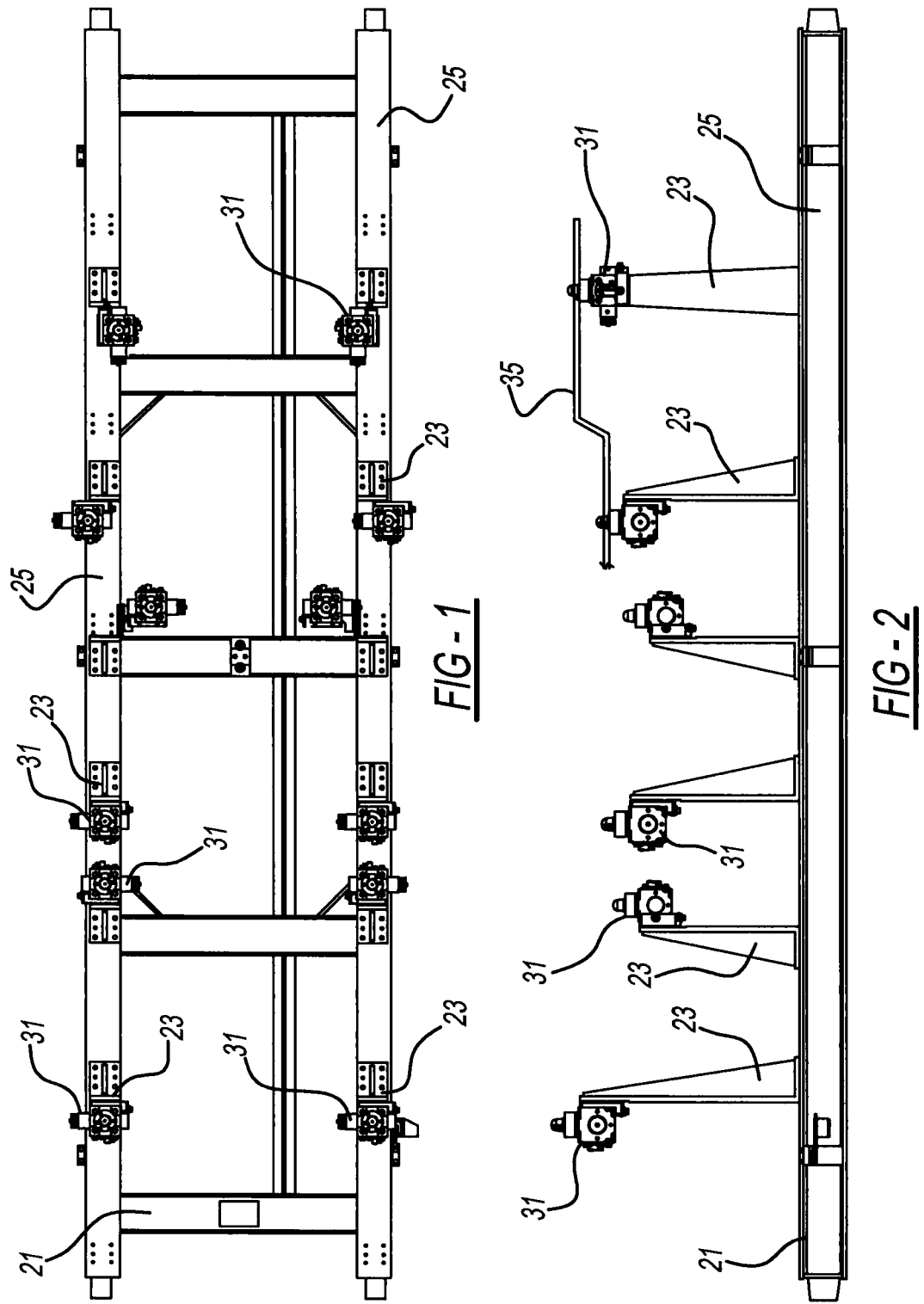

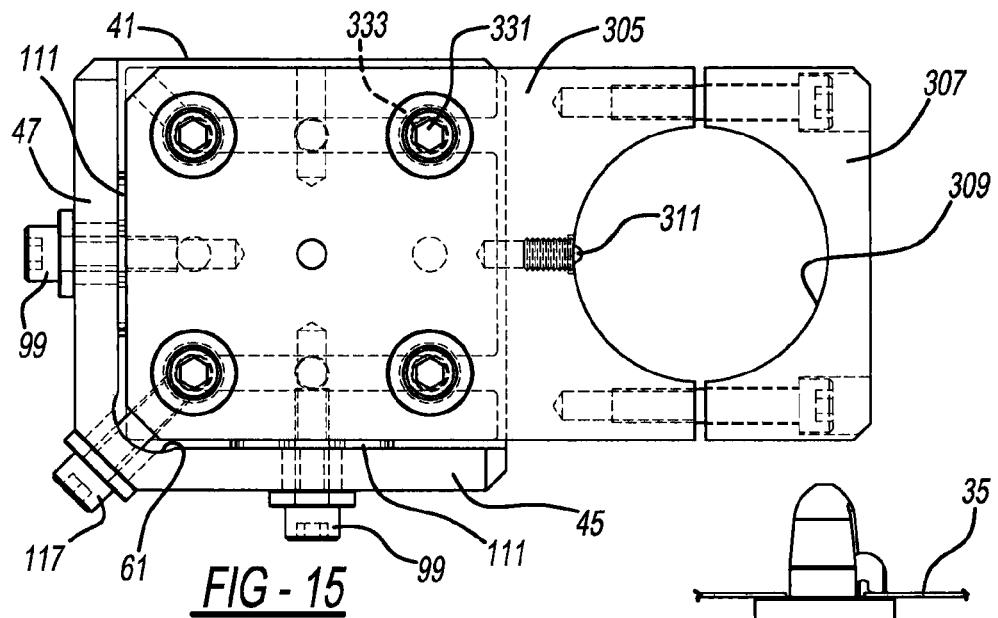
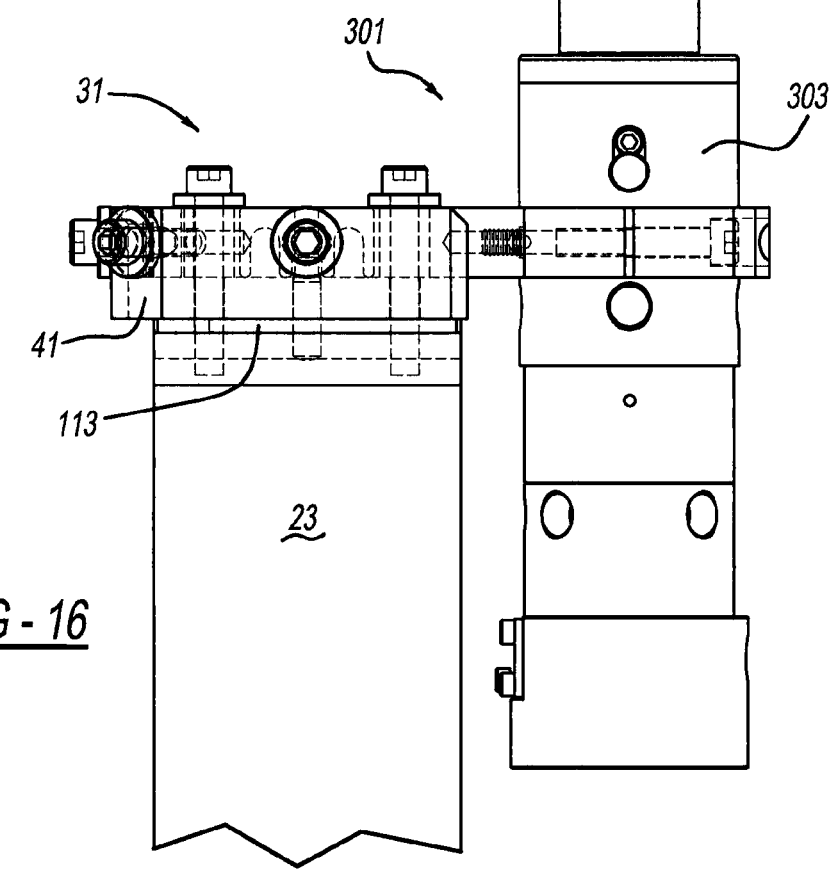

CLAMP MOUNTING SYSTEM

BACKGROUND AND SUMMARY

The invention generally pertains to a workpiece retaining clamp and more particularly to a clamp mounting system.

Various locking pin clamps have been used for vehicular assembly. Exemplary conventional constructions are disclosed in the following U.S. Pat. No. 8,001,673 entitled "Clamping Device for Vehicle Body Transfer Cart" which issued to Hur on Aug. 23, 2011; U.S. Pat. No. 7,469,473 entitled "Assembly Line Vehicle Body Positioning" which issued to Savoy on Dec. 30, 2008; and U.S. Pat. No. 6,687,971 entitled "Vehicle Body Transfer Machine and Method Thereof" which issued to Nakamura on Feb. 10, 2004. Another tradition example is disclosed in U.S. Patent Publication No. 2012/0030924 entitled "Vehicular Body Assembly Locking Apparatus and Method" which published to Kilibarda et al. on Feb. 9, 2012. These patents and application are all incorporated by reference herein. Conventional mounting and alignment of such clamps is time consuming and expensive. For example, many additional mounting brackets and fasteners are employed to orient conventional clamps relative to risers, pillars or locators. Furthermore, these traditional clamps are often difficult to place in differing orientations relative to the riser. Since many pin clamps are used on each assembly plant trolley or moving pallet, these extra mounting brackets collectively add considerable weight, part cost and set up time.

In accordance with the present invention, a single mounting device is provided for each trolley riser for use with a set of shims in order to accurately align and secure a clamp to a datum. In another aspect, a generally polyhedron-shaped clamp body is used with a mounting plate to secure a clamp in different orientations relative to a manufacturing plant locator. Still another aspect provides a blade extension and mounting plate attachment between a cylindrically shaped clamp housing and a datum. A reconfigurable extension kit is also employed with a pin clamp. Moreover, a method of assembling a clamp to a trolley is disclosed.

The present clamp mounting system is advantageous over conventional approaches since the present system does not require additional mounting brackets. Furthermore, the single mounting plate per structural riser allows for side or bottom mounting along vertical or horizontal datum surfaces. Additionally, the present system advantageously tightly fastens the clamp assembly against the mounting plate side walls with a single diagonal fastener, with optional shims in between. The generally symmetrical design of the clamp body allows for different clamp orientations relative to the mounting plate and structural datum, which provides for greater locational flexibility and reduced obstruction for optical sensing and workpieces during clamp alignment and clamping usage. Moreover, the present clamp mounting system reduces part costs, part weight and assembly time. Additional advantages and features of the present invention can be ascertained from the following description and claims as well as the appended drawings.

BRIEF DESCRIPTION OF THE DRAWINGS

FIG. 1 is a top elevational view showing an assembly plant trolley including multiples of a clamp mounting system;

FIG. 2 is a side elevational view showing the assembly plant trolley including multiples of the clamp mounting system;

FIG. 15 is a top elevational view showing the second embodiment clamp mounting system; and FIG. 16 is a side elevational view showing the second embodiment clamp mounting system.

DETAILED DESCRIPTION

Figure 3:
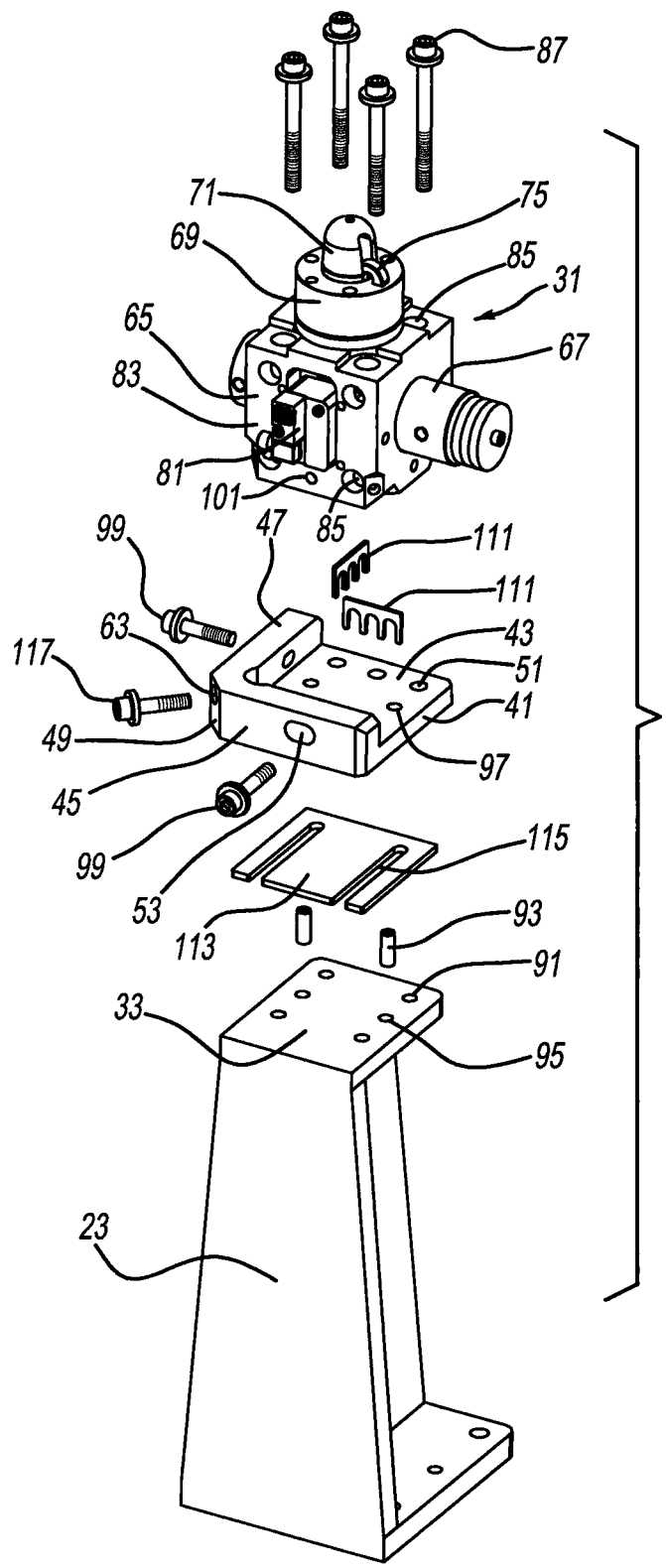
FIG. 3 is an exploded perspective view showing a first embodiment of the clamp mounting system.
Figure 4:
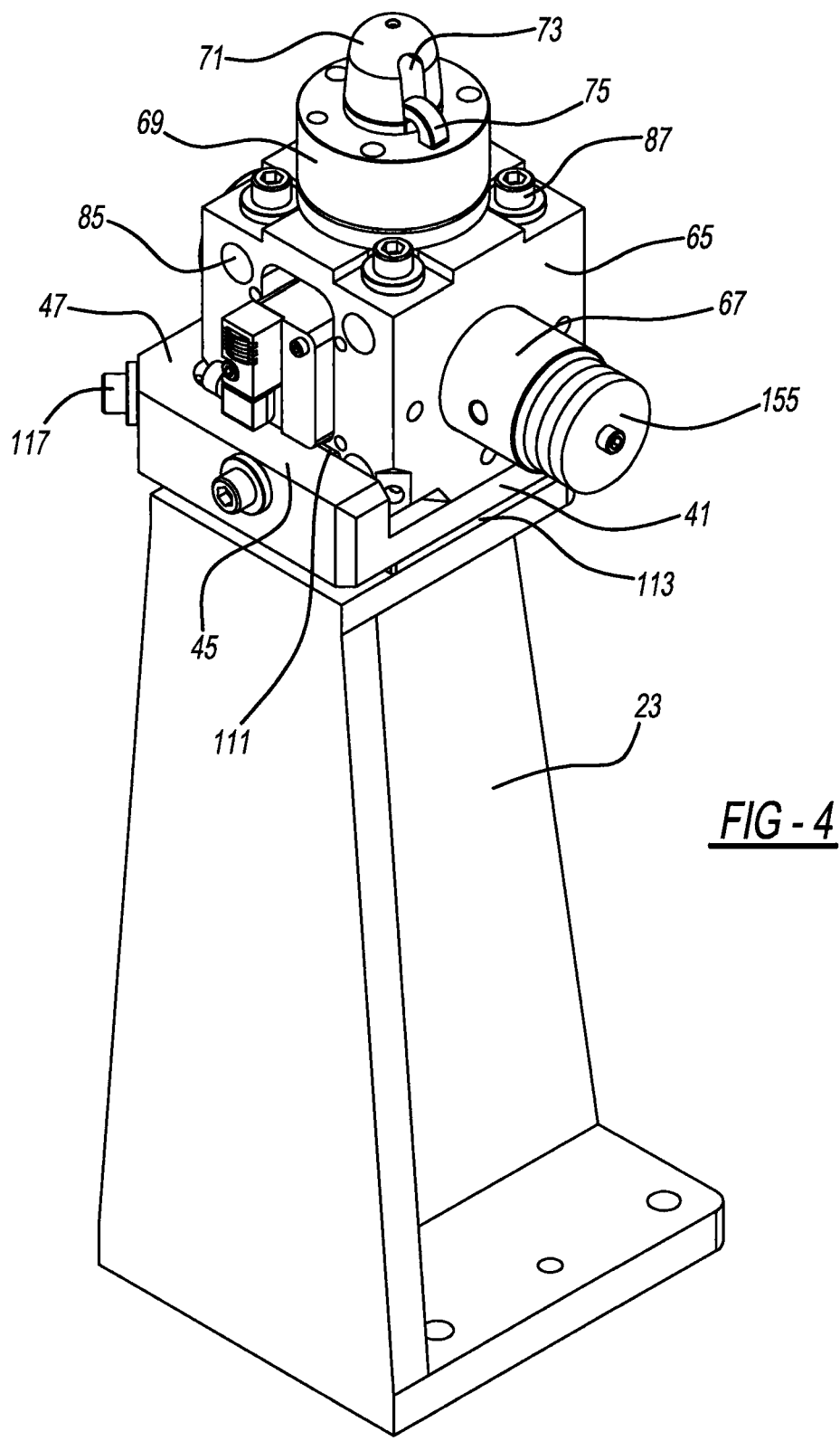
FIG. 4 is a perspective view showing the first embodiment clamp mounting system.
Figure 5:
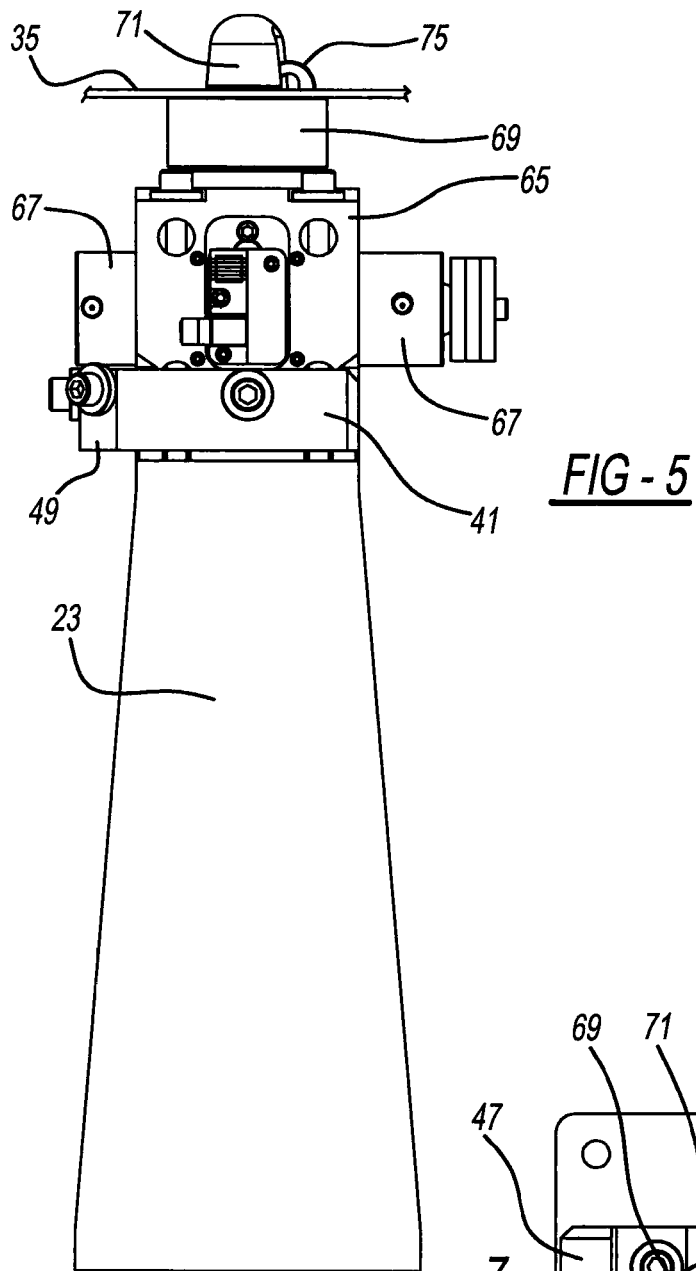
FIG. 5 is a side elevational view showing the first embodiment clamp mounting system.
Figure 6:
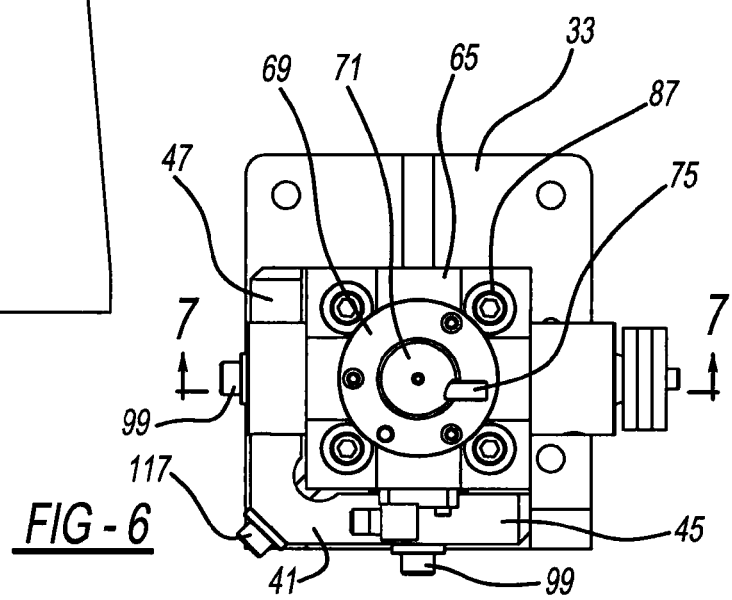
FIG. 6 is a top elevational view showing the first embodiment clamp mounting system.
Figure 8:
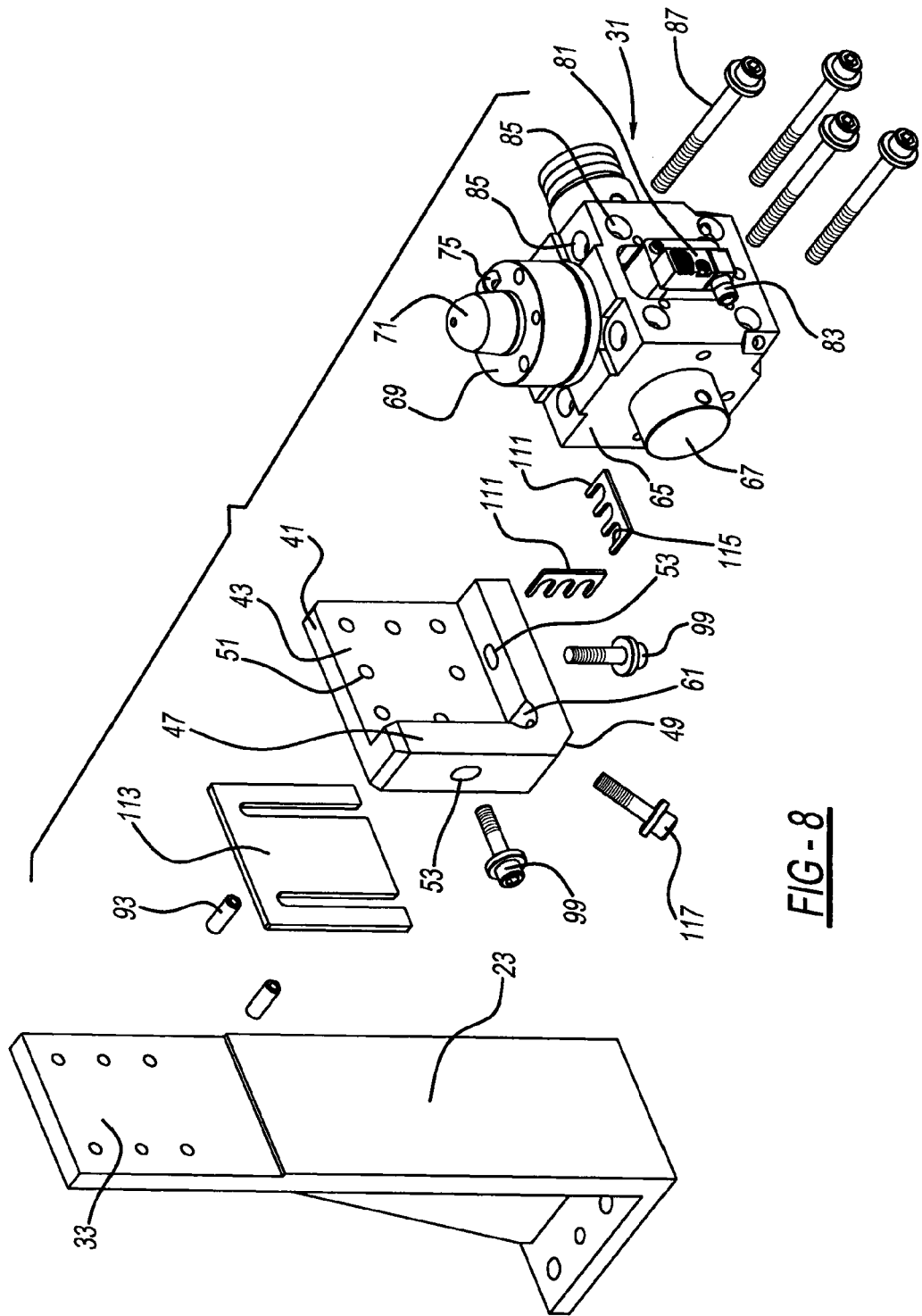
FIG. 8 is an exploded perspective view showing the first embodiment clamp mounting system in a different orientation.

Referring to FIGS. 1, 2, 3 and 8 a trolley 21, also known as a conveyor cart or pallet, is attached to and automatically moves along an assembly line in an automotive vehicle assembly plant. A plurality of upstanding structural risers, pillars or locators 23 are fixed to underlying horizontal beams 25 of each trolley 21. A mounting system attaches each pin clamp assembly 31 to a datum surface 33 of each riser 23. Each pin clamp serves to align and temporarily secure sheet metal automotive vehicle panels or workpieces 35 for movement with each trolley 21 as it moves from a loading station, to a welding or riveting station, and then to an unloading station. Risers 23 are illustrated as having either a horizontal datum surface, as shown in FIG. 3, or having a vertical datum surface, as shown in FIG. 8, however, diagonally angled or other orientations may be alternately provided for this datum surface which acts as a reference plane for alignment and mounting of pin clamp assembly 31.

Reference should now be made to FIGS. 3-6, which illustrate pin clamp assembly 31 mounted to horizontally oriented datum surface 33 of riser 23. An aluminum mounting plate 41 includes a generally flat base 43 bordered by a pair of upstanding and generally perpendicularly projecting side walls 45 and 47, which intersect at a corner 49. A set of holes 51 extend through base 43 and an elongated slot 53 extends through each side wall 45 and 47. A semicircular clearance cavity 61 is internally located opposite corner 49 and a through-hole 63 extends between corner 49 and clearance cavity 61.

Pin clamp 31 includes a generally polyhedron shaped, more preferably substantially cube-shaped, body 65 to which is attached a piston cylinder 67 extending outwardly therefrom. Body 65 is a machined aluminum block with internal bores. A cylindrical clamping collar or donut 69 is mounted to an external surface of body 65 and a tapered locating pin 71 is mounted to a distal end of clamping collar 69. Pin 71 is narrower than collar 69. Moreover, a slot 73 is located in a side of locating pin 71 and is accessible to a hollow central passageway extending through locating pin 71, collar 69 and body 65. This allows movement of a clamping finger 75 between an internally retracted unclamping position (see FIG. 7B) and externally extending clamping position (see FIGS. 5 and 7A).

A switch pack 81 and pneumatic fluid supply line fitting 83 also project from a surface of body 65. When the trolleys 21 are moved between stations, the pneumatic air and any electrical connection lines are detached, yet the internal clamping mechanism is designed to maintain a clamping position until the trolley is moved to the unloading station wherein the pneumatic and any electrical lines are reconnected and the clamps are released to allow workpiece unloading.

Four or more oversized and unthreaded holes 85 extend through opposed major external faces of body 65 within which smaller diameter shafts of threaded wall fasteners 87 extend. Threaded distal end segments of each bolt 87 are received within associated internally threaded holes 91 on datum surface 33 of riser 23, while trapping mounting plate 41 therebetween. Bolts 87 are initially set in a loose condition until alignment is completed. Locator dowel pins 93 snuggly fit within middle holes 95 of datum surface 33 and middle holes 97 in mounting plate 41. Furthermore, threaded bolt retention fasteners 99 adjustably extend through corresponding unthreaded and oversized slots 53 in side walls 45 and 47 of mounting plate 41 and threaded end segments of bolts 99 engage within intermediate threaded holes 101 of clamp body 65. Thus, fasteners 87 and 99 allow clamp assembly 31 to be loosely secured within mounting plate 41 at this initial assembly stage and are only tightened after alignment is completed.

Comb-like shims or spacers 111 are inserted between offset surfaces of clamp body 65 and the corresponding internal surfaces of side walls 45 and 47 of mounting plate 41 based on optical (e.g., camera or laser) x and y-axis setup alignment of clamp assembly 31 relative to datum surface 33. Additionally, a z-axis shim or spacer 113 is inserted in a parallel direction between the major surface of base 43 and datum surface 33. Elongated, spaced apart, parallel and openly accessible slots 115 in each shim 111 and 113 allow for shims to be inserted after the fasteners 99 and pins 93 are in place; in other words, the slots 115 can be slid around the fasteners and pin. Shims 111 and 113 are selected from a standard package of differing thickness NAAMS shims. Thus, if the optical alignment system indicates that the clamp body needs to be 0.5 mm further away from a side wall of the mounting plate then a corresponding 0.5 mm shim can be selected and inserted therein before a draw fastening bolt 117 diagonally snugs clamp body 65 against side walls 45 and 47. Similarly, if the alignment system determines that clamp assembly 31 needs to be positioned 1.0 mm further away from datum surface 33, then the technician will select a correspondingly thick shim 113 and insert same between base 43 and surface 33 prior to complete tightening of clamp body against mounting plate 41.

Figure 9:
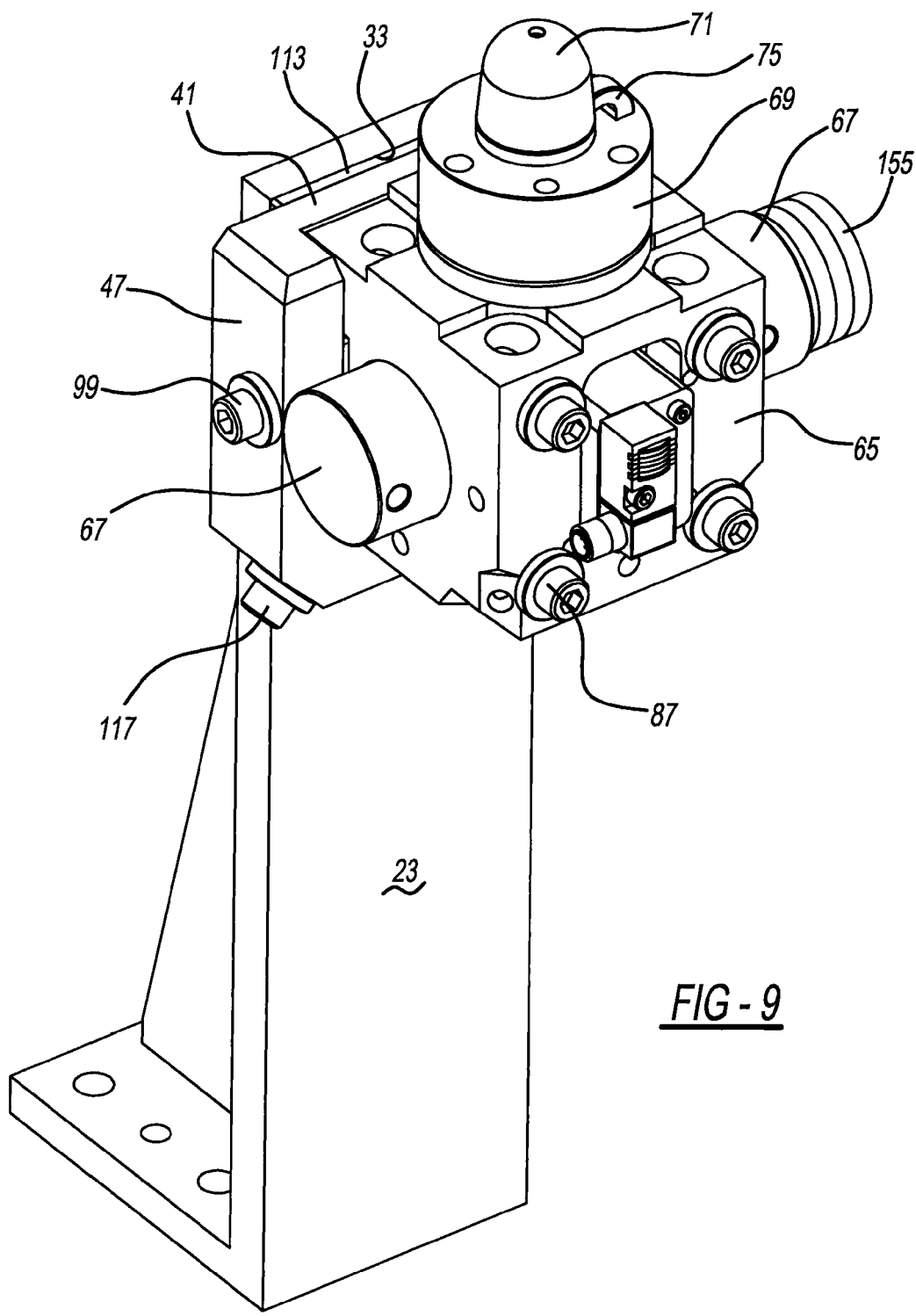
FIG. 9 is a perspective view showing the first embodiment clamp mounting system in the different orientation.
Figure 10:
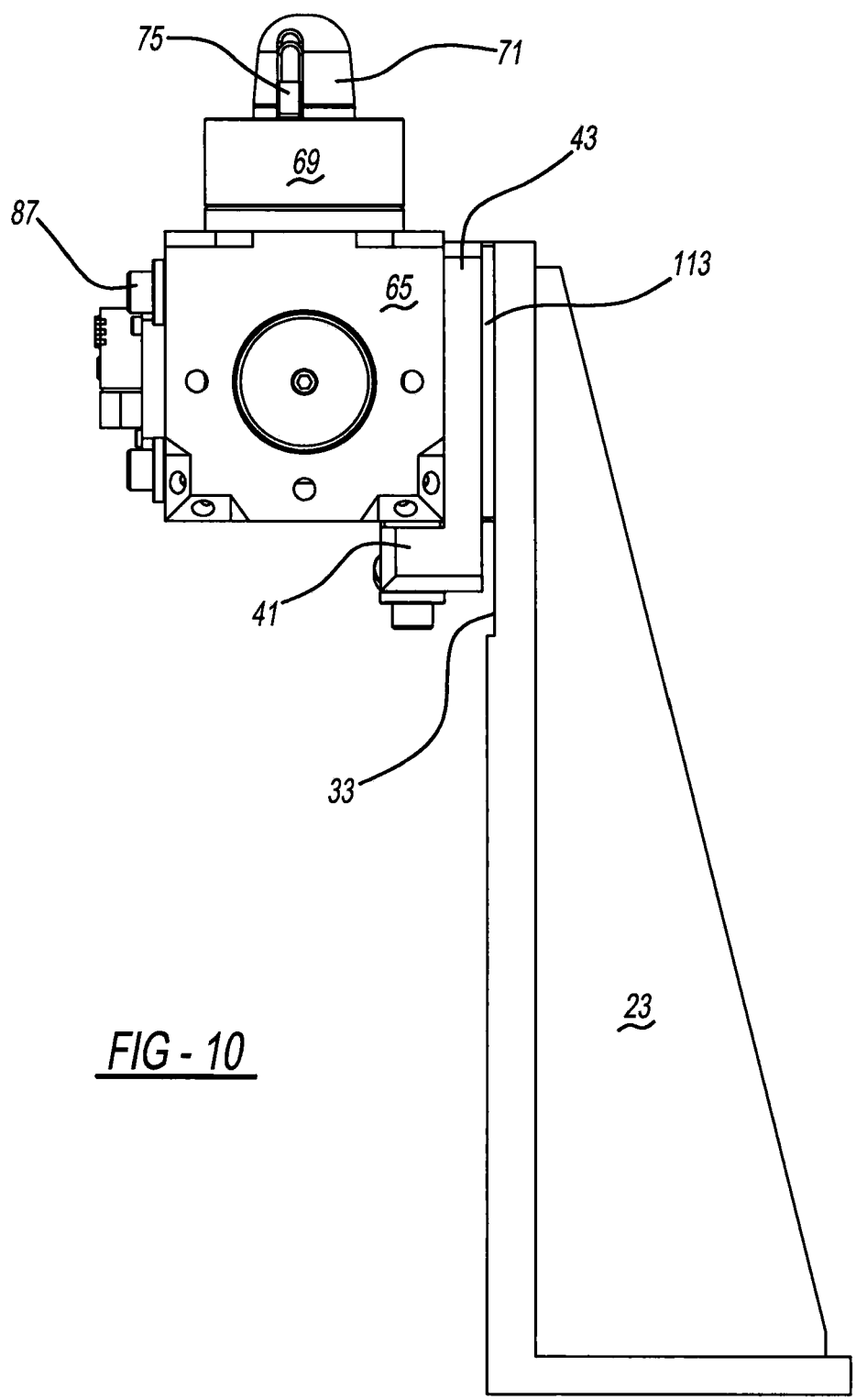
FIG. 10 is an elevational view showing the first embodiment clamp mounting system in the different orientation.

A similar arrangement is employed for the vertically oriented datum surface 33 and clamp assembly 31 shown in FIGS. 8-10. In this configuration, however, the generally cube-shaped configuration of clamp body 65 allows it to be mounted on a different side than that for the horizontal datum surface mounting of FIG. 3. It is noteworthy that only a single mount 41 and set of shims are needed in order to precisely align and secure a clamp to a structural datum member, thereby avoiding the extra expense, weight and setup time required for conventional supplemental bracketry and fasteners.

Figure 7:
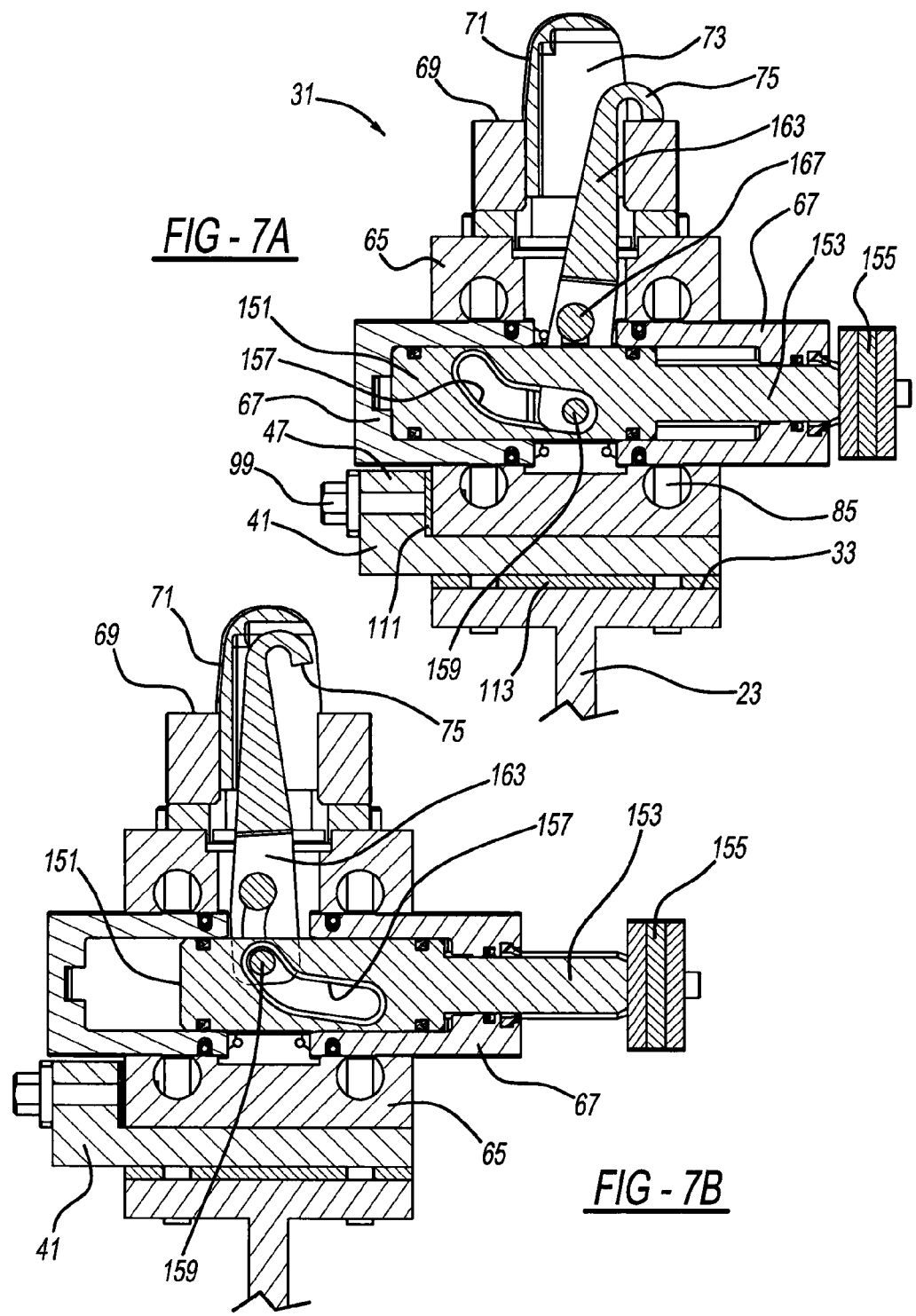
FIGS. 7A and 7B are cross-sectional views, taken along line 7-7 of FIG. 6, showing different positions of a clamp used in the first embodiment clamp mounting system.
Figure 12:
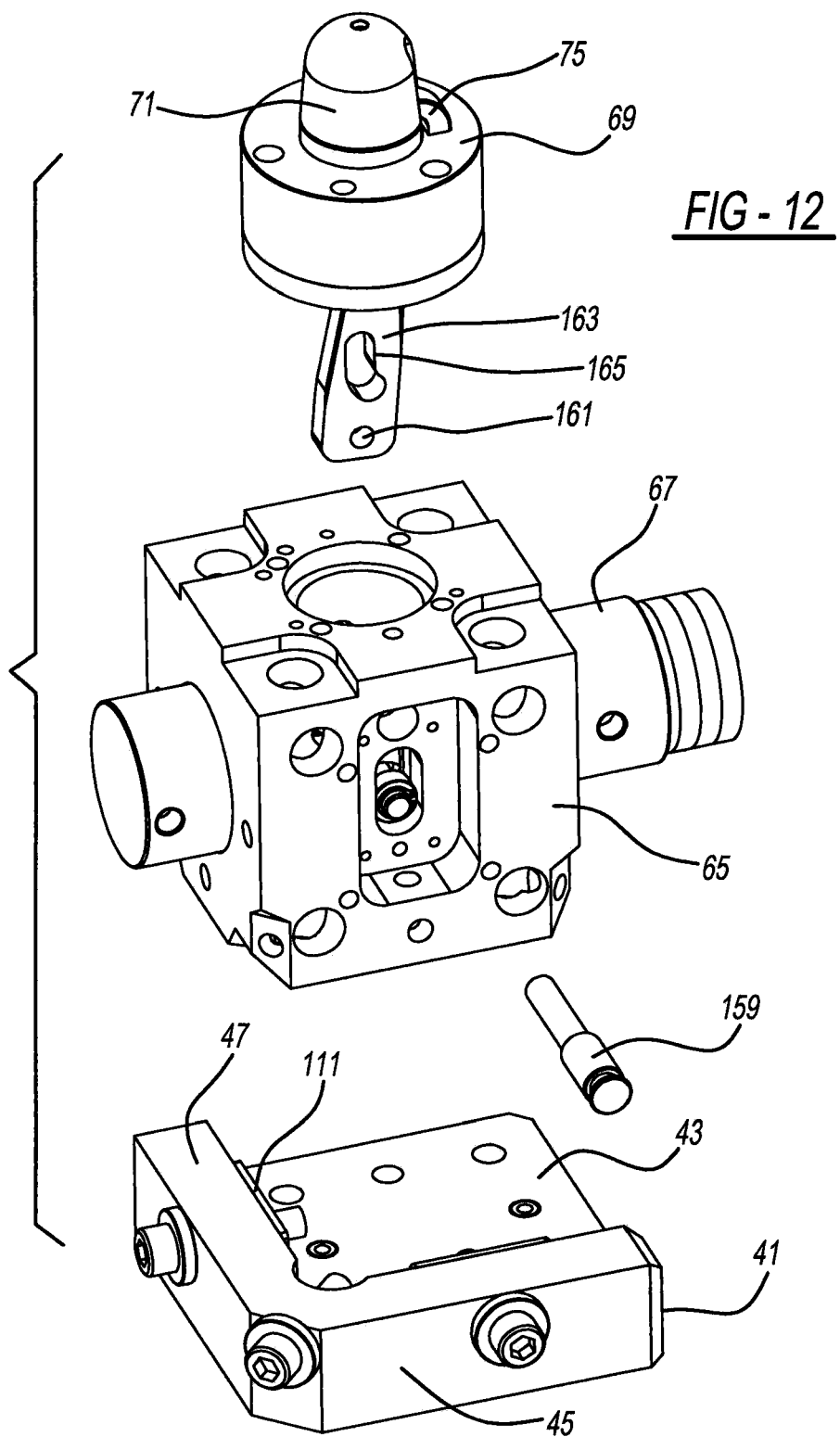
FIG. 12 is a partially exploded perspective view showing the first embodiment clamp mounting system.

The internal construction and operation of pin clamp assembly 31 can best be viewed in FIGS. 7A, 7B and 12. A pneumatically driven actuator piston 151 linearly advances or retracts within cylinder 67, primarily inside of body 65. A piston rod 153 coaxially projects from piston 151 and carries alternating black and white discs 155 on an external end thereof which are optically monitored by a camera or the like to determine actuation position.

An offset angled camming slot 157 is internally disposed within piston 151, or alternately rod 153, within which is a cam follower pin 159. Cam follower pin 159 is also attached to an aperture 161 at a distal end of a longitudinally elongated shaft 163, at an opposite end of which is located clamping finger 75. A middle section of shaft 163 includes an offset angled camming slot or surface 165 within which rides another cam follower 167 attached to an inside of body 65. Thus, when piston 151 is moved, it will in turn, cause clamping finger 75 to move from an unclamped position to a clamped position, and vice versa. Such an arrangement is disclosed is U.S. Pat. No. 6,378,855 entitled "Locking Pin Clamp" which issued to Sawdon et al. on Apr. 30, 2002, and is incorporated by reference herein.

Figure 13:
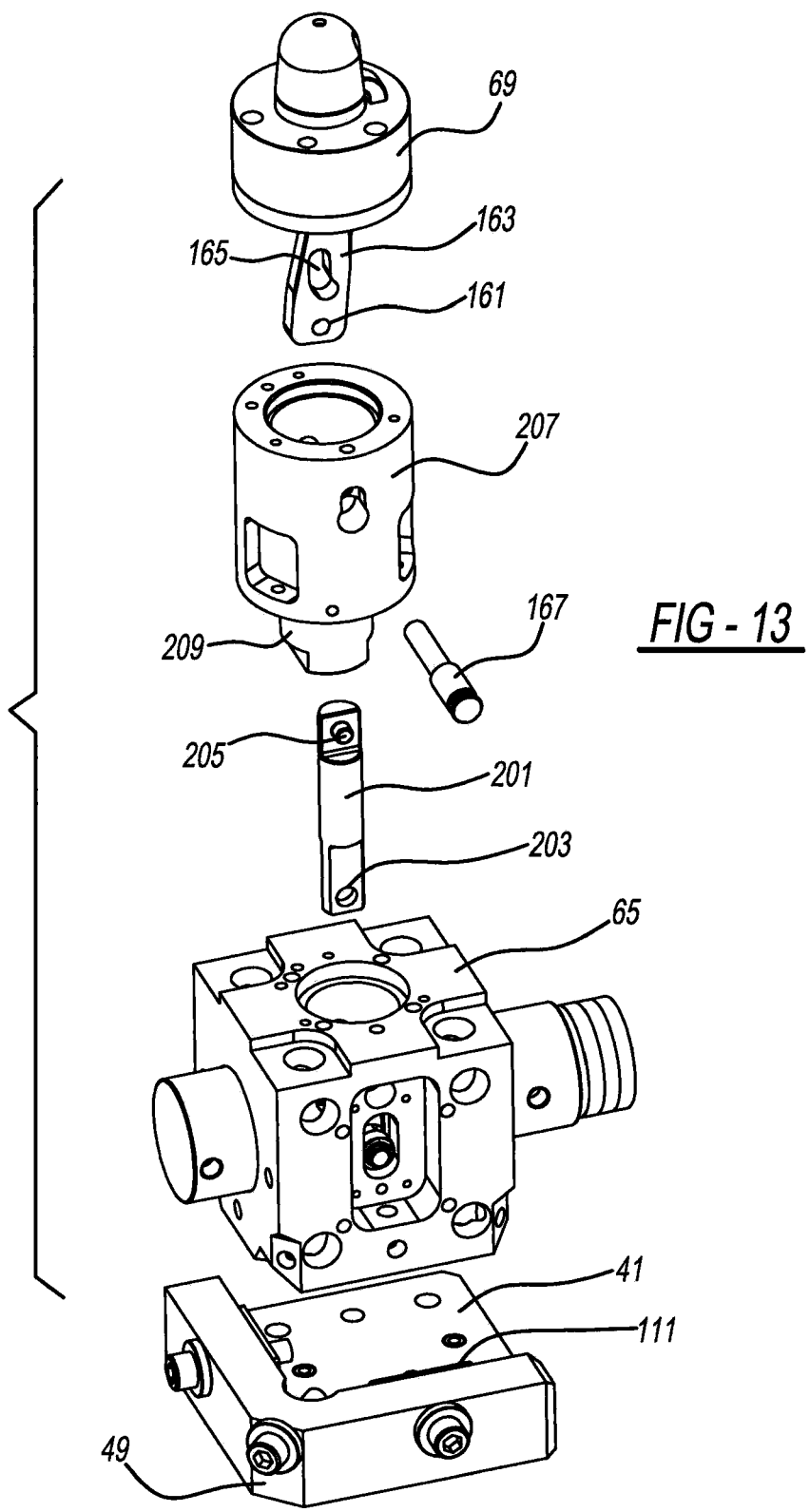
FIG. 13 is a partially exploded perspective view showing an extension kit optionally employed with the first embodiment clamp mounting system.

FIG. 13 shows an optional expansion kit for use when a longer distance is desired between the clamping location and the clamp body. It is used to reconfigure an existing clamp. Prior clamp constructions, such as those disclosed in U.S. Pat. No. 7,516,948 to McIntosh and U.S. Pat. No. 6,698,736 to Dugas, use shims 74 and spacers 45A and 70, respectively, in a crude attempt to retrofit existing designs. In contrast, however, the present expansion kit is especially designed in a refined manner so as to be more accurate, easily attachable and durable during repeated use in a dirty manufacturing plant environment. In the present construction, an extension rod 201 has a bore 203 at a first end for receiving cam follower 159 and has a pin 205 laterally projecting at an opposite second end for attachment to a bore 161 of clamping number 163. A circular-cylindrical extension housing 207 is bolted on top of housing 65 and clamping collar 69 is bolted on top of an end of extension housing 207. Cam follower pin 167 laterally extends through extension housing 207 for engagement with camming slot 165 while clamping number 163. Extension housing 207 additionally includes a hollow neck section 209 for guiding extension rod 201. Depending on the extra distance desired, this extension kit allows for an extra clamp-to-body distance greater than 10 mm, and more preferably at least 25 mm, which would be unsuitable for prior spacers.

Figures 11, 14:
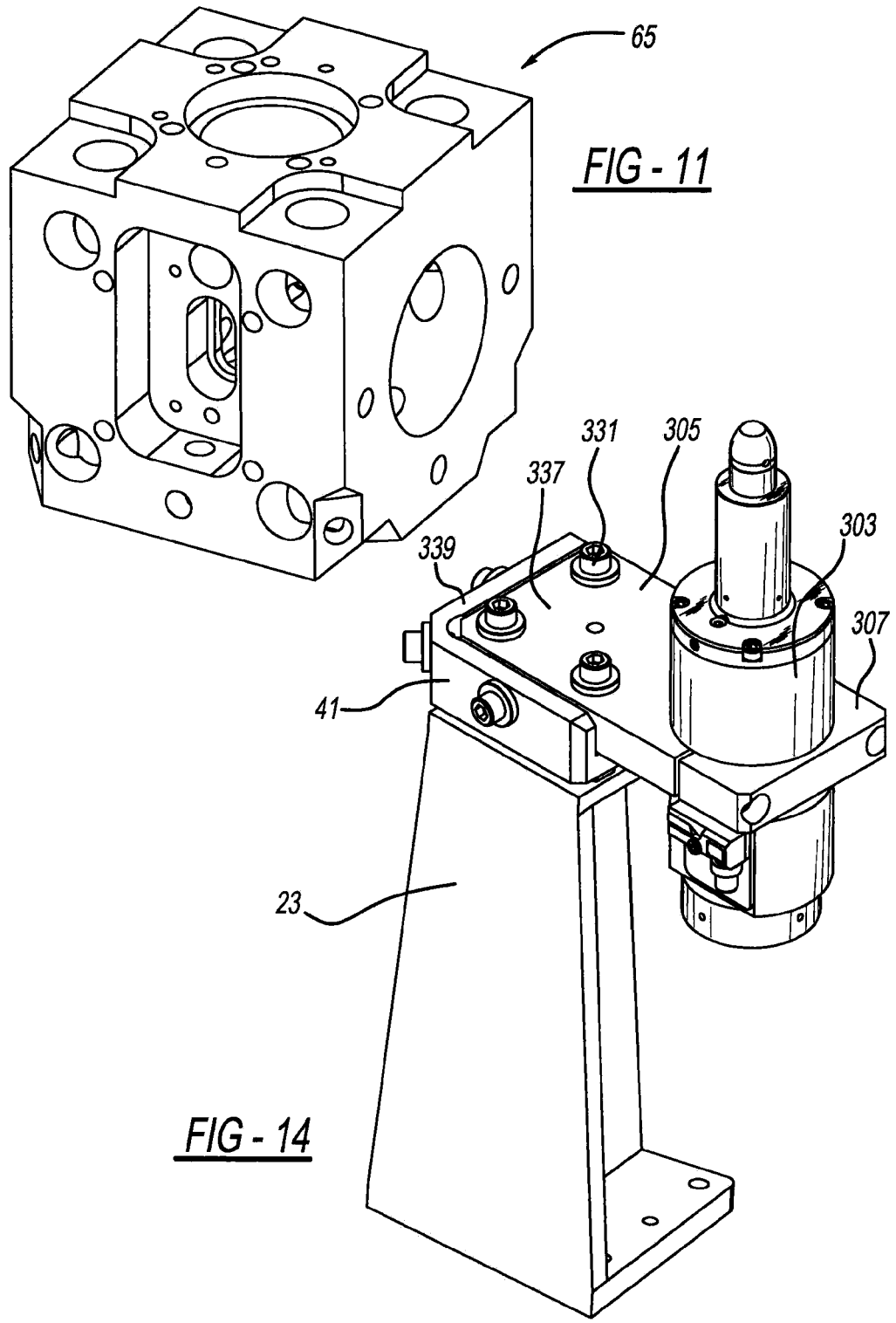
FIG. 11 is a perspective view showing a clamp body of the first embodiment clamp mounting system.
FIG. 14 is a perspective view showing a second embodiment clamp mounting system.

Reference should now be made to FIGS. 14-16. In this second clamp assembly configuration, the same mounting plate 41, riser 23, and shims 111 and 115 are employed as with the prior embodiment. They are used, however, with a differently shaped clamp assembly 301. The automatically actuated, locating pin clamp is of the type disclosed in U.S. Patent Publication No. 2011/0291341 entitled "Pin Clamp" which published to Edwin Sawdon et al. on Dec. 1, 2011, which is incorporated by reference herein. Of note, this locating pin clamp has a circular-cylindrical housing 303 which is retained by a removable blade extension 305 and bolted on end cap 307 which internally define a generally circular collar or cavity 309 therebetween. Extension 305 and cap 307 define a generally rectangular-polyhedron peripheral shape and a finger 311 projects within cavity 309 for further securing housing 303 therein. For purposes of this application, extension 305, cap 307 and housing 303 are all considered to be the clamp body. Bolts 331 extend through unthreaded and oversized holes 333 in extension 305 to initially loosely secure extension 305 to a base of mounting plate 41. Thereafter, shims 111 are inserted between upstanding side walls 45 and 47, and the adjacent flat surfaces of extension 305, whereafter draw bolt faster 117 snugly tightens extension 305 against the mounting plate side walls. Shim 115 is also inserted between mounting plate 41 and the datum surface of riser 23, if needed, prior to complete tightening of bolts 331. In the fully tightened condition, the major flat exposed surface 337 of extension 305 is generally flush or slightly below flush with an upper edge 339 of upstanding walls 45 and 47. This generally flush configuration provides extra sheet metal workpiece 35 clearance and optical sensing clearance to the clamping area without unnecessary obstruction.

While various configurations of the present clamp mounting system have been disclosed, it should be appreciated that other variations may be employed. For example, while three shims have been disclosed, in practice, only one or two shims may actually be needed depending on the sensed alignment situation presented. Conversely, two or more shims may be stacked upon each other if extra space is required. Furthermore, while threaded bolts have been shown for retention, it is envisioned that other fasteners that perform the same function can ultimately be used, although some advantage may not be realized. Moreover, while a structural riser and trolley have been shown, other assembly plant fixtures having a stationary mounting and/or datum orientation surface can be substituted therefore, although certain advantages of the present system may not be achieved. It is also envisioned that other clamp constructions can be used with the present mounting system although certain advantages may not be realized. For example, an electromagnetically actuated or even manually lever actuated clamps can be used with the present mounting system, but the many benefits of the automated pneumatic clamp and locating pin construction disclosed herein may be forfeit. It is alternately envisioned that shim 113 can be inserted between base 43 of mounting plate 41 and clamp body 65 or 305.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. It is intended by the following claims to cover these and any other departures from the disclosed embodiments which fall within the true spirit of this invention.

The invention claimed is:

1. A clamp mounting system comprising:
   a structural member having a datum surface;
   a mount removably attachable to the structural member, the mount including a base, a substantially perpendicular first side wall and at least a substantially perpendicular second side wall;
   a clamp including a body removably attachable to the mount;
   at least one shim insertable between at least one of: (a) the base of the mount and the datum of the structural member, (b) the first side wall of the mount and the adjacent body of the clamp, or (c) the second side wall of the mount and the adjacent body of the clamp; and
   a fastener extending through a hole at an intersection of the side walls of the mount and engaging the body of the clamp, tightening of the fastener pulling the body of the clamp against the side walls of the mount or the shims if located therebetween.

2. The system of claim 1, wherein the clamp further comprises:
   a pneumatically driven piston;
   a clamping finger movable from a retracted to a clamping position in response to movement of the piston; and
   a locating pin having a substantially tapered shape.

3. The system of claim 2, wherein the clamp further comprises:
   an elongated extension rod coupling the piston to the clamping finger;
   a hollow extension housing surrounding at least a majority of the extension rod and being removably attached to the body; and
   a clamping support removably mounted on top of the extension housing, the locating pin being coaxially mounted to the clamping support;
   the piston advancing and retracting substantially perpendicular to a receiving direction of the locating pin and an elongated direction of the extension rod.

4. The system of claim 1, wherein the body of the clamp has a substantially polyhedron shape with six major external surfaces, holes extending through at least four of the surfaces for allowing at least two of the major surfaces to be positioned against the face wall of the mount, further comprising elongated threaded fasteners loosely extending through the holes in the body which are oversized relative to shanks of the fasteners which allow the clamp body to be loosely secured to the mount, the fastener at the intersection and at least one of the shims accurately and firmly securing the clamp body relative to the mount after the threaded fasteners attach the body to the mount.

5. The system of claim 4, further comprising:
   a threaded shim fastener extending through a slotted hole in the first side wall of the mount to secure a least one of the shims between the first side wall and the clamp body, and an end of the threaded fastener enmeshing with an internally threaded hole in the clamp body; and
   another threaded shim fastener extending through a slotted hole in the second side wall of the mount to secure a least one of the shims between the second side wall and the clamp body, and an end of the threaded fastener enmeshing with another internally threaded hole in the clamp body;
   the shim fasteners allowing the clamp to be loosely secured to the mount so that the shims can be inserted thereafter.

6. The system of claim 1, wherein:
   the structural member is a right-angle riser mounted to a moving assembly line trolley;
   the clamp is automatically actuated which secures an automotive vehicle panel to the riser;
   at least one of the shims is located between the base of the mount and the datum surface of the riser;
   at least a second of the shims is located between the first side wall of the mount and the clamp body;
   at least a third of the shims is located between the second side wall of the mount and the clamp body;
   and the single mount and the shims precisely setting the three-dimensional positioning of the clamp relative to the riser.

7. The system of claim 1, wherein the clamp body includes a substantially rectangular extension and cap assembly defining a substantially circular collar for receiving a cylindrical housing of the clamp, the extension being received in the mount with the substantially flat and externally exposed surface of the extension being substantially flush with a distal edge of the side walls of the mount.

8. The system of claim 1, wherein the at least one shim has flat peripheral edges, parallel flat faces between the edges and at least two openly accessible and parallel-elongated slots, the shim is inserted after loose fastening of the clamp to the mount, and the mount is aluminum.

9. A clamp mounting system comprising: a riser having a mounting surface; a single mounting plate associated with the riser, the mounting plate including a base and side walls projecting from the base; a first shim removably located against and parallel to the base of the mounting plate, the mounting plate being fastened to the riser with a locating dowel pin attached therebetween; an automatically powered clamp fastened to the mounting plate; and shims located between the side walls of the mounting plate and the clamp; the single mounting plate and the shims precisely aligning the clamp relative to the riser in three dimensions.

10. The system of claim 9, wherein the mounting plate can be reoriented relative to the riser in order to place a locator pin of the clamp in a vertical, horizontal or diagonal receiving orientation.

11. The system of claim 9, further comprising a sheet metal automotive vehicle panel secured to the riser by the clamp.

12. The system of claim 9, wherein the clamp further comprises:
a pneumatically driven piston;
a clamping finger movable from a retracted to a clamping position in response to movement of the piston; and
a locating pin having a substantially tapered shape.

13. The system of claim 9, wherein the body of the clamp has a substantially polyhedron shape with six major external surfaces, holes extending through at least four of the surfaces to allow at least two of the major surfaces to be positioned against the base of the mounting plate, further comprising elongated threaded fasteners loosely extending through the holes in the body which are oversized relative to shanks of the fasteners which allow the clamp body to be loosely secured to the mounting plate, the diagonal fastener and at least one of the shims accurately and firmly securing the clamp body relative to the mounting plate after the threaded fasteners attach the body to the mounting plate.

14. The system of claim 9, wherein the at least one shim has flat peripheral edges, parallel faces between the edges and at least two openly accessible and elongated slots, the shim is inserted after loose fastening of the clamp to the mounting plate, and the mounting plate is aluminum.

15. A clamp mounting system comprising:
a trolley including a locating member;
a single mounting plate removably attachable to the locating member, the mounting plate including a base, a substantially perpendicular first wall and at least a substantially perpendicular second wall;
an automatically powered clamp including a body removably attachable to the mounting plate, a workpiece-locating pin and a clamping finger;
spacers insertable between: (a) the base of the mounting plate and the locating member, (b) the first wall of the mounting plate and the body of the clamp, and (c) the second wall of the mounting plate and the body of the clamp;
retention fasteners initially loosely attaching the clamp body to at least one of the mounting plate and the locating member;
the spacers each having at least one elongated and openly accessible slot to allow the spacers to be slid around the installed retention fasteners;
a draw fastener extending through a hole at an intersection of the walls of the mounting plate and engaging the body of the clamp, tightening of the fastener diagonally pulling the body of the clamp against the spacers located against the walls of the mounting plate; and
an automotive vehicle panel held by the clamp to the trolley.

16. The system of claim 15, wherein the clamp further comprises:
a pneumatically driven piston; and
the clamping finger movable from a retracted to a clamping position in response to movement of the piston;
the locating pin having a substantially tapered shape.

17. The system of claim 15, wherein the clamp body has a substantially polyhedron external shape, and a fluid powered piston moves within the body to actuate the clamping finger.

18. The system of claim 15, wherein the clamp body includes a substantially rectangular extension and cap assembly defining a substantially circular internal collar for receiving a cylindrical housing of the clamp, the extension being received in the mounting plate with the substantially flat and externally exposed surface of the extension being substantially flush or below flush with a distal edge of the side walls of the mount.

19. The system of claim 9, wherein the mounting plate can be reoriented relative to the riser in order to place a locator pin of the clamp in a vertical, horizontal or diagonal receiving orientation.

20. A clamp mounting system comprising:
a mount comprising a base and perpendicularly projecting walls which all join together at an intersection;
a clamp assembly adjustably secured to the base and side walls by threaded retainer fasteners extending through unthreaded and oversized holes;
side shims located between the clamp assembly and the walls of the mount;
a base shim located against the base of the mount, each of the shims including at least one elongated slot; and
a draw fastener projecting through an oversized hole in the intersection of the mount walls, a threaded end segment of the draw fastener attaching to the clamp assembly, the draw fastener diagonally pulling the clamp assembly against the shims;
the shims and mount accurately positioning the clamp assembly.

21. The system of claim 20, further comprising a riser having a datum surface, the mount being removably attached to the riser with the base shim located between the mount and the datum surface.

22. The system of claim 20, wherein the clamp assembly further comprises:
a pneumatically driven piston;
a clamping finger movable from a retracted to a clamping position in response to movement of the piston; and
a locating pin having a substantially tapered shape.

23. The system of claim 20, wherein each of the shims has flat peripheral edges, parallel faces between the edges and at least two openly accessible and elongated slots the shims are inserted after loose fastening of the clamp to the mount.

24. A clamp mounting system comprising: an automatically powered actuator; an elongated shaft movable in response to energization of the actuator, a clamping finger movably coupled to the elongated shaft, a tapered located pin; and a substantially polyhedron-shaped body having at least two offset mounting surfaces with oversized attachment holes extending therethrough; at least portions of the actuator and shaft being movable within the body in at least one operating condition, and the locating pin and clamping finger being located external to the body when they are in at least the clamping condition; a trolley riser and a single mounting plate removably attached to the riser, and either of the mounting surfaces of the clamp body contacting against the mounting plate; the mounting plate including a base, a substantially perpendicular first wall and at least a substantially perpendicular second wall; spacers insertable between: (a) the base of the mounting plate and the locating member, (b) the first wall of the mounting plate and the body of the clamp, and (c) the second wall of the mounting plate and the body of the clamp.

25. The system of claim 24, wherein the actuator is a fluid powered piston which moves in a direction substantially perpendicular to a receiving direction of the locating pin.

26. The system of claim 24, further comprising an elongated extension rod coupling the shaft to the actuator, and an extension housing surrounding a majority of the extension rod and coupling a clamping support to the body.

27. A method of assembling a powered clamp to an automotive vehicle assembly plant trolley, the method comprising:
(a) attaching a single mount to a member of the trolley;
(b) initially loosely fastening the powered clamp to the single mount prior to complete alignment;
(c) inserting shims between side walls of the mount and the clamp;
(d) tightly fastening the clamp against the shims;
(e) inserting another shim with its largest surface parallel to a largest base surface of the mount; and
(f) clamping an automotive vehicle panel to the trolley by the clamp.

28. The method of claim 27, further comprising tightening a draw bolt extending through a corner hole in the mount to tightly fasten a substantially cube-shaped body of the clamp to the shims located against the upstanding side walls of the mount.

29. The method of claim 27, further comprising positioning an aperture of the automotive vehicle panel onto a tapered locating pin of the clamp prior to pneumatically actuating a piston clamps the panel, the clamp remaining in a panel-clamping condition when pneumatic pressure is removed to allow the trolley to be moved along the assembly line, and the single mount and shims serving as the sole device for accurately aligning and maintaining the position of the associated clamp relative to the trolley member.

* * * * *